UNITED STATES PATENT OFFICE.

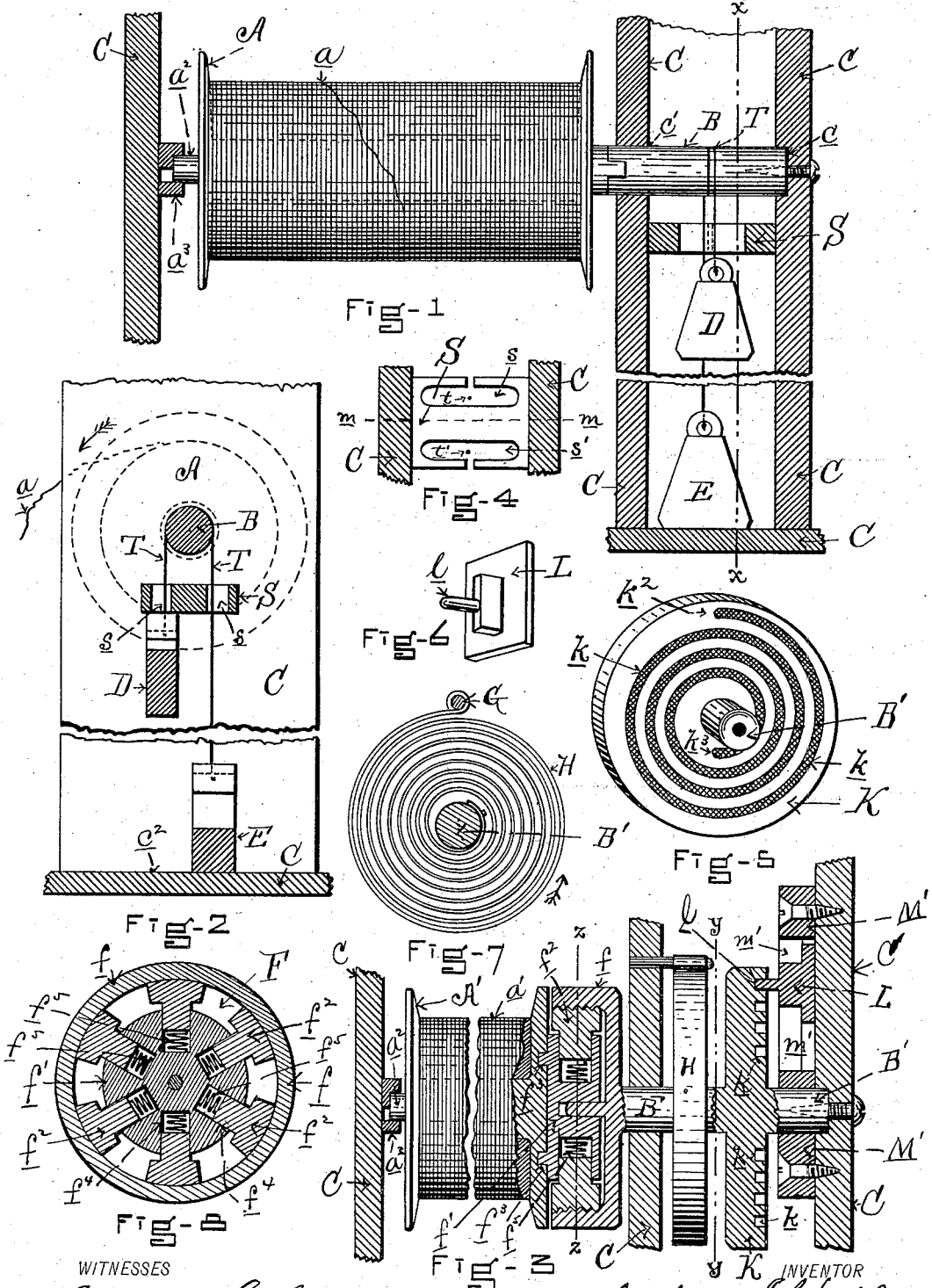

ANDREW JACKSON CHASE, OF BOSTON, MASSACHUSETTS.

STORE-SERVICE APPARATUS FOR TWINE.

SPECIFICATION forming part of Letters Patent No. 365,794, dated July 5, 1887.

Application filed October 13, 1886. Serial No. 216,103. (No model.)

*To all whom it may concern:*

Be it known that I, ANDREW JACKSON CHASE, a citizen of the United States, residing at Boston, in the county of Suffolk and Commonwealth of Massachusetts, have invented a certain new and useful Store-Service Apparatus for Twine, of which the following is a true and complete specification.

My invention relates to an apparatus for serving twine in stores, in which the twine is so held that it may be easily and rapidly withdrawn from the said apparatus as it is required; and, further, when the end of the twine is released, after the amount necessary for immediate use has been detached, the protruding portion of twine will be automatically withdrawn within the said apparatus, leaving only a small length outside, the amount of which may be regulated at will.

My invention is intended to provide an apparatus by which the twine is kept conveniently within reach, and yet not in the way of those passing near it.

My apparatus is inclosed in a suitable casing, and is intended to stand on the counter or hang on the wall, as may be desired, and may be so regulated that the end of the twine will hang just within easy reach of the attendant, and no more.

In the drawings, Figure 1 is a front elevation and part section showing my improvement. Fig. 2 is a side section of the same through the line X X. Fig. 3 is a front elevation and part section showing a modification of my improvement. Fig. 4 is a view of the stop S. Fig. 5 is a view of the disk K. Fig. 6 is a view of the block L. Fig. 7 is a view and section on the line Y Y. Fig. 8 is a section on the line Z Z.

A is a spool, on which is wound a certain amount of twine, $a$. It is provided at one end with a pin, $a^2$, which rests and is free to revolve in a journal, $a^3$, from which it is adjustably removable, and has at the other end, removably attached to it, a shaft or drum, B, which revolves with it, and which is journaled in the frame C at $c$ and $c'$. Around the shaft or drum B are wrapped one or more turns of stout cord, T, to the ends of which are attached two weights, D and E, the weight E being much heavier than the weight D. The cord T is wrapped upon the shaft B in such a direction that when the heavier weight, E, descends the twine on the spool A will be reeled in, and, consequently, when the twine $a$ is reeled off from the spool the weight E will rise.

Directly below the drum B is placed the stop S, a plan view of which is shown in Fig. 4, the dotted line $m$ $m$ denoting the axis of the drum B. The cord T passes through the orifices $s$ and $s'$ at the points $t$ and $t'$. The string $a$ being withdrawn from the spool A, and the spool A and drum B being thereby revolved in the direction of the arrow, Fig. 2, the weight E will rise and the weight D will fall until the top of the weight E has reached the stop S, at which time the weight D will rest upon the bottom of the cabinet at $c^2$, Fig. 2. The string $a$ being further withdrawn from the spool A, the drum B will then revolve within the embrace of the cord T, and independent of it and the weights D and E, until such an amount of the string $a$ has been withdrawn as is required. The end of the string $a$ being then released, the weight E will descend by its superior weight, revolving the drum B and spool A in the opposite direction from that shown in Fig. 2, and so rewind a portion of the string $a$ upon the spool A. The stop S is not an essential part of my invention, as the moment the weight D reaches the bottom of the cabinet the friction of the cord T upon the drum B would be so diminished as to allow said drum to revolve freely independently of said cord. It is, however, introduced as a matter of precaution in case the cord T in passing around the drum should lap upon itself, in which case the stop S would prevent the further rise of the weight E.

In Fig. 3 I have shown a modification of my device, which operates by means of a spring instead of weights.

A' is the spool upon which is wound the string or twine $a'$. At $a^3$ the spool is journaled as before, and at its other end is removably attached to one member of a friction-clutch, F, the other member of which is attached to the shaft B'. Any convenient form of clutch may be used, but I preferably use the one shown in Figs. 3 and 8, in which $f$ is the outer shell attached to the shaft B', and $f'$ is an inner block attached to the spool A' by the lugs $f^3$, which fit into corresponding recesses in said spool. It is provided with slots $f^4$, in which slide the segmental blocks $f^2$, which are forced outward against the inside of the shell $f'$ by the springs $f^5$.

To the shaft B' is connected one end of the spiral spring H, (shown in Fig. 7,) the other end of which is attached to the frame C by the pin G, Fig. 3. Attached to the shaft B' and forming an integral part of it is the disk K, (shown in perspective in Fig. 5,) which is provided on one side with the spiral groove $k$, adapted to engage with the end of the pin $l$, which is carried by the block L, Fig. 6, which slides in a vertical groove, $m'$, of the plate M'. The string $a'$ being reeled off from the spool A', the spool A', shaft B', and disk K will revolve in the direction indicated by the arrow in Fig. 7, thus winding up the spring H, and the pin $l$ will slide in the spiral groove $k$ from the point $k^2$, where it is at the beginning of the operation, to the point $k^3$, at which point the revolution of the shaft B' will cease. The string $a'$ being further withdrawn, the spool A' will revolve independent of the shaft B' by virtue of a slip in the clutch F, the strength of the springs $f^5$ being proportioned to that end. The end of the string $a'$ being released, the spring H will rewind the string $a'$ upon the spool A' until the pin $l$ has traveled in the slot $k$ from the point $k^3$ to the point $k^2$. By varying the length of the cord T or that of the spiral groove $k$ the amount of the twine $a$ rewound may be regulated.

I do not confine my invention to the exact mechanical devices shown, as I am aware that the same results may be produced by other mechanism; but the devices shown I preferably use.

It is obvious that my invention may be used with ribbon or other similar cords or bands to measure off and deliver the same in stores and other places, as well as for twine.

What I claim as new and of my invention is—

1. A store-service apparatus for twine, consisting of a revolving spool upon which the twine is wound and from which it is withdrawn for use, in combination with a sheave or drum rigidly attached thereto and revolving with it, having wrapped around it one or more turns of a cord, to the extremities of which are suspended weights, substantially as described, all operating substantially as set forth.

2. In a store-service apparatus for twine, the combination of a twine-carrying spool and a drum or spindle rigidly attached thereto having wrapped upon it one or more turns of cord, from the extremities of which are suspended two weights differing in size, substantially as and for the purposes set forth.

3. In a store-service apparatus for twine, in combination, a drum or spindle adapted to be set in motion by the removal of the twine, a cord wrapped thereon, and a heavy and a light weight, substantially as and for the purposes described.

4. The combination of the spool A, the drum B, the cord T, and the weights D and E, substantially as and for the purposes described.

5. In a store-service apparatus for twine, the combination of the revolving drum B, the cord T, the weights D and E, and the stop S, substantially as described.

6. In a store service apparatus for twine, the combination of the spool A', the frictional clutch F, the shaft B', the spring H, the disk K, provided with the spiral groove $k$, and the pin $l$, operating substantially as and for the purposes described.

7. In a store-service apparatus for twine, a twine-carrying spool having a drum or spindle attached thereto, in combination with the cord and weights T and D E, frictionally connected therewith, all operating substantially as set forth.

In witness whereof I have hereunto set my hand.

ANDREW JACKSON CHASE.

Witnesses:
CHARLES COLE,
J. P. SNOW.